Patented Oct. 9, 1945

2,386,273

UNITED STATES PATENT OFFICE 2,386,273

CARBONATES OF 1-R-1 AMINOETHANES

Horace A. Shonle and Ewald Rohrmann, Indianapolis, Ind., assignors to Eli Lilly and Company, Indianapolis, Ind., a corporation of Indiana No Drawing. Application January 15, 1943,
Serial No. 472,488

8 Claims. (Cl. 260—583)

Our invention relates to carbonates of 1-R-1-aminoethanes, in which R represents an aliphatic hydrocarbon radical having from 4 to 9 carbon atoms, and inhalant preparations containing those carbonates; and to the method of producing them. It relates more particularly to carbonates of 2-aminoalkanes; and most especially to the carbonates of 2-aminoheptane, 2-amino-4-methylhexane, and 2-amino-4-methylheptane.

These 1-R-1-aminoethanes themselves are subject-matter of our copending applications Serial Nos. 433,458, 433,459, 438,304, and 438,661, filed March 5, 1942, March 5, 1942, April 9, 1942, and April 11, 1942, respectively. When locally applied to the mucous membrane, these 1-R-1-amino-ethanes are physiologically active as vasoconstrictors, and serve to relieve nasal congestion.

These 1-R-1-aminoethanes may be prepared by several methods, including the following:

Method 1

One molecular equivalent of a methyl ketone having the following formula:

is reacted with slightly more than one molecular equivalent of hydroxylamine. Desirably, the hydroxylamine is prepared in the presence of the ketone by reacting the hydrochloride or sulfate or other salt of the hydroxylamine with a suitable base, such as sodium carbonate or sodium hydroxide. Desirably, the reaction mixture is agitated for a few hours to insure the conversion of the ketone to the corresponding oxime. The resulting methyl ketone oxime separates and is dried by any suitable means, such as with a dehydrating agent, for example, sodium sulfate or magnesium sulfate. After drying, the methyl ketone oxime is reduced with sodium and alcohol. The resulting 1-R-1-aminoethane is purified by distillation.

Method 2

Another method of preparing 1-R-1-aminoethanes is to react one molecular equivalent of a methyl ketone corresponding to the composition represented by said formula with approximately four molecular equivalents of formamide. The mixture is heated to a temperature of 185–190° C. and maintained at that temperature until the liberation of ammonium carbonate ceases. This condition may be readily ascertained by observing a condenser attached to the reaction mixture. The reaction product is separated from the excess formamide by adding water to the mixture, agitating, and separating the reaction product, which is insoluble in water, from the water solution. The reaction product is then refluxed with an excess of mineral acid, such as concentrated hydrochloric or dilute sulfuric acid. Desirably, the reaction mixture is refluxed for a period of from 1 to 2 hours, during which time the acid addition salt of 1-R-1-aminoethane is formed. If the base 1-R-1-aminoethane is desired the acid addition salt is treated with a suitable base, such as sodium carbonate or sodium hydroxide. If purification is desired, it may be distilled. In this method ammonium formate may be used instead of formamide with very good results. As in the case of formamide, best results are obtained by using an excess of the ammonium formate.

Method 3

A third method of preparing these 1-R-1-amino-ethanes is to subject a quantity of the corresponding methyl ketone to the action of ammonia and hydrogen in the presence of a suitable catalyst, such as Raney nickel. Desirably, an excess of ammonia and hydrogen is used and the reaction may be conveniently performed in a bomb by dissolving the ammonia in a solvent such as ethanol.

We have found that the carbonates of these amines dissociate slowly at room temperature, to liberate the free amines and carbon dioxide and water. By this slow dissociation, the free amines, which are fairly volatile, become available in slow but continuous supply. This property of these amine carbonates makes them of value for use in inhalers.

These amine carbonates are very sparingly soluble in liquid petrolatum; and in some vegetable oils, such as cottonseed oil. They are somewhat more soluble in esters of fatty acids, such as ethyl oleate. At room temperature some of these amine carbonates are solids, while others (as so far prepared) are viscous liquids.

These amine carbonates may be easily prepared from the corresponding amines by any of the following methods:

1. By passing dry carbon dioxide gas through a quantity of the amine which contains a one-half molecular equivalent of water, until the increase in weight indicates that the theoretical amount of carbon dioxide, namely, a one-half molecular equivalent, has been taken up.

2. By passing moist carbon dioxide gas through the dry amine until an increase in weight has occurred corresponding to a one-half molecular equivalent of the water and a one-half molecular equivalent of carbon dioxide.

3. By passing moist carbon dioxide gas through a dry solution of the amine in a volatile solvent, such as ether, until the theoretical increase in weight has occurred as noted in 2 above; and subsequently removing the ether by careful evaporation.

4. By dissolving the moist amine in an oil base, such as mineral oil, cottonseed oil, or olive oil, adding a solution-facilitating substance, such as menthol, camphor, oil of lavender, or oil of rose, and passing in moist carbon dioxide until the theoretical increase in weight has occurred as noted in 1 above. Instead of having both the amine and the carbon dioxide moist, either of them may be dry; but at least one of them should carry sufficient moisture for the production of the carbonate. When thus prepared, it is convenient to leave the amine carbonate in the oil base.

The reaction of carbon dioxide and water with the amine to form the amine carbonate is exothermic, with considerable liberation of heat. Best results are obtained if this heat is prevented from unduly raising the temperature of the reaction mixture, by suitably keeping the mixture cool during the carbonate-forming reaction; desirably by preventing the temperature from rising above about 30° C.

An analysis of the amine carbonates indicates that the reaction of carbon dioxide and water with the amine produces the normal carbonate, and not the bicarbonate, as the main reaction product. This reaction is indicated by the following equation:

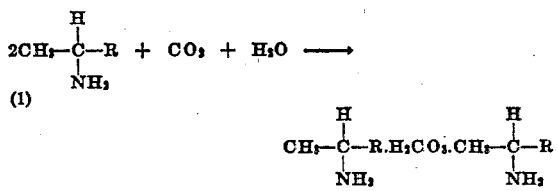

in which R has the same significance as before. Thus two mols of the amine combine with one mol each of carbon dioxide and of water.

These amine carbonates have several important advantages over the free amines, especially in inhalers. Among these advantages are the following:

1. At a given temperature the liberation of the free amines due to dissociation is at a relatively constant rate.
2. The useful life of an inhaler employing them is increased.
3. The dosage is controlled.
4. Too violent effects are avoided.

The amine carbonates may be used as such, as in inhalers. But we deem it preferable to use them in solution in oil bases. Such solutions may be prepared by dissolving the already prepared amine carbonates in such oils, desirably with some solution-facilitating substance copresent, such as menthol, camphor, oil of lavender, or oil of rose. But we prefer to prepare such solutions by forming the amine carbonate in the oil base, as outlined under 4 above. Such an oil solution of an amine carbonate may be placed on cotton pledgets, and used in suitable inhalers.

The following are examples of our invention:

*Example 1.—Preparation of 2-aminoheptane carbonate*

Two hundred thirty grams (2 mols) of 2-aminoheptane and 18 g. (1 mol) of water are placed in a tared 1-liter 3-necked flask which is equipped with a mechanical stirrer, a thermometer, and a gas delivery tube. The flask is surrounded by a cooling bath of ice and water. Dry carbon dioxide is then introduced into the solution, with constant stirring, through the gas delivery tube, until the increase in weight is approximately 44 g. The temperature during this addition is maintained between 20° and 30° C. As the reaction proceeds, the mixture becomes quite viscous, and the rate of reaction with the carbon dioxide becomes slower.

On standing, the viscous material sets to a white solid, which consists essentially of almost pure 2-aminoheptane carbonate. On standing at room temperature, this white solid dissociates very slowly to 2-aminoheptane, carbon dioxide, and water. This dissociation is sufficiently slow that an inhaler containing this carbonate is effective for months. At higher temperatures this dissociation takes place quite rapidly.

*Example 2.—Preparation of 2-aminoheptane carbonate*

Twenty-nine grams of dry 2-aminoheptane is dissolved in 200 cc. of dry ether. The flask is surrounded with a bath of cold water (15°–20° C.), and a fairly rapid stream of moist carbon dioxide is passed into the solution for a period of about 30 minutes. The ether is then removed, as by evaporation in vacuo at room temperature. This yields a viscous residual liquid that on standing sets to a white solid, which consists essentially of 2-aminoheptane carbonate.

*Example 3.—Preparation of 2-amino-4-methylhexane carbonate*

One hundred fifteen grams (1 mol) of 2-amino-4-methylhexane and 9 g. (0.5 mol) of water are placed in a tared 500 cc. 3-necked flask which is equipped with a mechanical stirrer, a thermometer, and a gas delivery tube. The flask is surrounded by a cooling bath of ice and water. Dry carbon dioxide gas is introduced into the solution through the gas delivery tube, with constant stirring, until the increase in weight is approximately 22 g. (0.5 mol). The temperature during this addition is maintained between 20° and 30° C. A viscous liquid results, and consists essentially of 2-amino-4-methylhexane carbonate. This also dissociates very slowly at room temperature to the free amine, carbon dioxide, and water; and is effective as an inhalant.

*Example 4.—Preparation of 2-amino-4-methylheptane carbonate*

Sixty-five grams of 2-amino-4-methylheptane and 4.5 g. of water are placed in a tared 500 cc. 3-necked flask which is equipped with a mechanical stirrer, a thermometer, and a gas delivery tube. The flask is surrounded by a cooling bath of ice and water. Dry carbon dioxide gas is introduced into the solution through the gas delivery tube, with stirring, until the increase in weight is approximately 11 g. The temperature during this addition is maintained between 20° and 30° C. A viscous liquid results; consisting essentially of 2-amino-4-methylheptane carbonate. This finally sets to a crystalline mass of small white plates. This 2-amino-4-methylheptane carbonate also dissociates very slowly at room temperature to the free amine, carbon dioxide, and water; and is effective as an inhalant.

*Example 5.—2-Aminoheptane carbonate inhalant preparation*

Nine grams of water is added to 115 g. of dry 2-aminoheptane. To this solution is added 11.5 g. of menthol and 25 g. of oil of rose (natural or synthetic). When all of the menthol has dissolved, 80 g. of paraffin oil is added. The resulting solution is placed in a tared 1-liter 3-necked flask which is equipped with a mechanical stirrer, a thermometer, and a tube for introducing gas. The flask is surrounded by a cooling bath of ice and water. Dry carbon dioxide is then introduced into the stirred solution until the increase in weight is about 22 g. The temperature during this operation is kept below 30° C.

The resulting mixture may be placed on cotton pledgets for use in inhalers.

*Example 6.—Preparation of a 2-amino-4-methylhexane carbonate inhalant mixture*

Nine grams of water is added to 115 g. of dry 2-amino-4-methylhexane. To this solution is added 11.5 g. of menthol and 35 g. of oil of lavender. When all of the menthol has dissolved, 115 g. of cottonseed oil is added. The mixture is then treated with dry carbon dioxide gas essentially as described in Example 5 for 2-aminoheptane.

The resulting mixture may be placed on cotton pledgets for use in inhalers, as in Example 5.

*Example 7.—Preparation of a 2-amino-4-methylheptane carbonate inhalant mixture*

Four and five tenths grams of water is added to 65 g. of 2-amino-4-methylheptane. To this solution is added 4 g. of menthol, 2 g. of camphor, and 10 g. of oil of rose geranium. When all of the menthol and camphor has dissolved, 65 g. of ethyl oleate is added. The mixture is then treated with dry carbon dioxide gas essentially as described in Example 5 for 2-amino-heptane. The resulting mixture may be placed on cotton pledgets for use in inhalers, as in Example 5.

In Examples 5, 6, and 7 other substances may be used as the base; such as peanut oil, lauryl alcohol, etc. Other aromatic compounds may be used in place of the menthol and oil of rose, oil of lavender, or oil of rose geranium; such for example as phenylethyl alcohol, oil of thyme, oil of cedar, etc. The aromatic compounds are selected not only to yield a product having a pleasant odor but also they serve to facilitate solution and they favor the formation of a more homogenous mixture of the amine carbonate in oil.

In all of Examples 5, 6, and 7, the amine carbonate in the oil base slowly dissociates, and thus makes the volatile free amine effectively available for inhalation.

*Example 8.—Unsaturated amine carbonates*

In the foregoing examples the amine carbonates were 2-aminoalkane carbonates, which are the most effective inhalants. Our invention is not limited, however, to carbonates of 2-aminoalkanes, but includes carbonates of 2-aminoalkenes and of 2-aminoalkines; which are also effective as inhalants (though in general rather less so than the 2-aminoalkanes). For instance, in Examples 1, 2, and 5, instead of using 2-aminoheptane as the initial amine, we may use either a 2-aminoheptene or a 2-aminoheptine.

We claim as our invention:

1. A carbonate of 1-R-1-aminoethane in which R is an aliphatic hydrocarbon radical having from 4 to 9 carbon atoms.

2. An amine carbonate as set forth in claim 1, in which R is alkyl.

3. An amine carbonate having the following general formula:

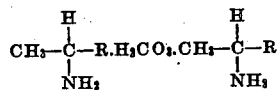

in which R is an aliphatic radical having from 4 to 9 carbon atoms.

4. An amine carbonate as set forth in claim 3, in which R is alkyl.

5. 2-aminoheptane carbonate.

6. 2-amino-4-methylhexane carbonate.

7. 2-amino-4-methylheptane carbonate.

8. The process of producing an amine carbonate as defined in claim 1, which consists in causing the 1-R-1-aminoethane to react with carbon dioxide and with water to produce such carbonate.

HORACE A. SCHONLE.
EWALD ROHRMANN.